US007899054B2

(12) United States Patent
Ohara

(10) Patent No.: US 7,899,054 B2
(45) Date of Patent: Mar. 1, 2011

(54) MANAGEMENT DEVICE AND PROGRAM

(75) Inventor: Kiyotaka Ohara, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 478 days.

(21) Appl. No.: 11/480,489

(22) Filed: Jul. 5, 2006

(65) Prior Publication Data

US 2007/0011294 A1 Jan. 11, 2007

(30) Foreign Application Priority Data

Jul. 5, 2005 (JP) .................. 2005-196299

(51) Int. Cl.
*H04L 12/56* (2006.01)
(52) U.S. Cl. ......... 370/392; 709/220; 709/224; 709/238; 709/249
(58) Field of Classification Search ........................ None
See application file for complete search history.

(56) References Cited

U.S. PATENT DOCUMENTS

| 2003/0088665 A1* | 5/2003 | Sauermann ................... 709/224 |
| 2004/0078481 A1* | 4/2004 | Rudd et al. .................. 709/238 |
| 2004/0111494 A1* | 6/2004 | Kostic et al. ................. 709/220 |
| 2005/0086332 A1 | 4/2005 | Nakazawa |
| 2006/0015635 A1* | 1/2006 | Fernandes et al. ............ 709/232 |
| 2006/0087962 A1* | 4/2006 | Golia et al. .................. 370/216 |
| 2006/0215654 A1* | 9/2006 | Sivakumar et al. .......... 370/389 |

FOREIGN PATENT DOCUMENTS

| JP | 2000-183874 A | 6/2000 |
| JP | 2003-18185 A | 1/2003 |
| JP | 2004-048649 A | 2/2004 |
| JP | 2004-356679 A | 12/2004 |
| WO | WO 2005/046164 A1 | 5/2005 |

OTHER PUBLICATIONS

Japanese Notification of Reasons of Rejection, with an English translation thereof, issued in Patent Application No. 2005-196299 dated on Jun. 5, 2008.

* cited by examiner

*Primary Examiner* — Jayanti K Patel
*Assistant Examiner* — Anthony Sol
(74) *Attorney, Agent, or Firm* — Scully, Scott, Murphy & Presser, P.C.

(57) ABSTRACT

According to an aspect of the invention, there is provided a management device used in a network to which nodes are connected. The management device includes an information requesting unit to send out a request packet requesting address information concerning addresses of each node through the network while using a predetermined single protocol, an information receiving unit to receive the address information retuned from each node as a response to the request packet, and an information displaying unit to display addresses contained in the received address information such that if two or more addresses are in the address information received from a single node, the two or more addresses are treated as addresses belonging to the single node.

16 Claims, 10 Drawing Sheets

MANAGEMENT DEVICE AND PROGRAM

CROSS-REFERENCE TO RELATED APPLICATION

This application claims priority under 35 U.S.C. §119 from Japanese Patent Application No. 2005-196299, filed on Jul. 5, 2005. The entire subject matter of the application is incorporated herein by reference.

FIELD

Aspects of the present invention relate to a management device which is connected to nodes such as a printer through a network and has a function of managing information concerning the nodes.

BACKGROUND

Recently, an IPv6 (Internet Protocol version 6) based communication protocol (hereafter, referred to as an IPv6 protocol) has become commercially practical. Since a shift from the widely used IPv4 based communication protocol (hereafter, referred to as an IPv4 protocol) to the IPv6 protocol thoroughly and immediately is impossible and a considerable time period is required to completely shift to the IPv6 protocol, it is considered that a network environment having mixed protocols of IPv4 and IPv6 is used during a period of the shift from IPv4 to IPv6. In Japanese Patent Provisional Publication No. 2000-183874, a technique for managing a node having IPv4 and IPv6 addresses on a management device is suggested.

In a network including a management device and nodes, the management device is able to obtain an address assigned to each node by broadcasting or multicasting a request for address information and receiving the address information returned from the nodes in response to the request. In a network environment including an IPv4 based node and an IPv6 based node, the management device is able to obtain address information from an IPv4 node by outputting a request for address information by broadcast based on IPv4 without specifying an address of each node in the request. The management device is also able to obtain address information from an IPv6 node by outputting a request for address information by multicast based on IPv6 without specifying an address of each node in the request.

SUMMARY

Aspects of the present invention are advantageous in that a management device, capable of judging a node supporting both the IPv4 and IPv6 to be a single node, is provided.

BRIEF DESCRIPTION OF THE ACCOMPANYING DRAWINGS

DETAILED DESCRIPTION

General Overview

Figure 1:
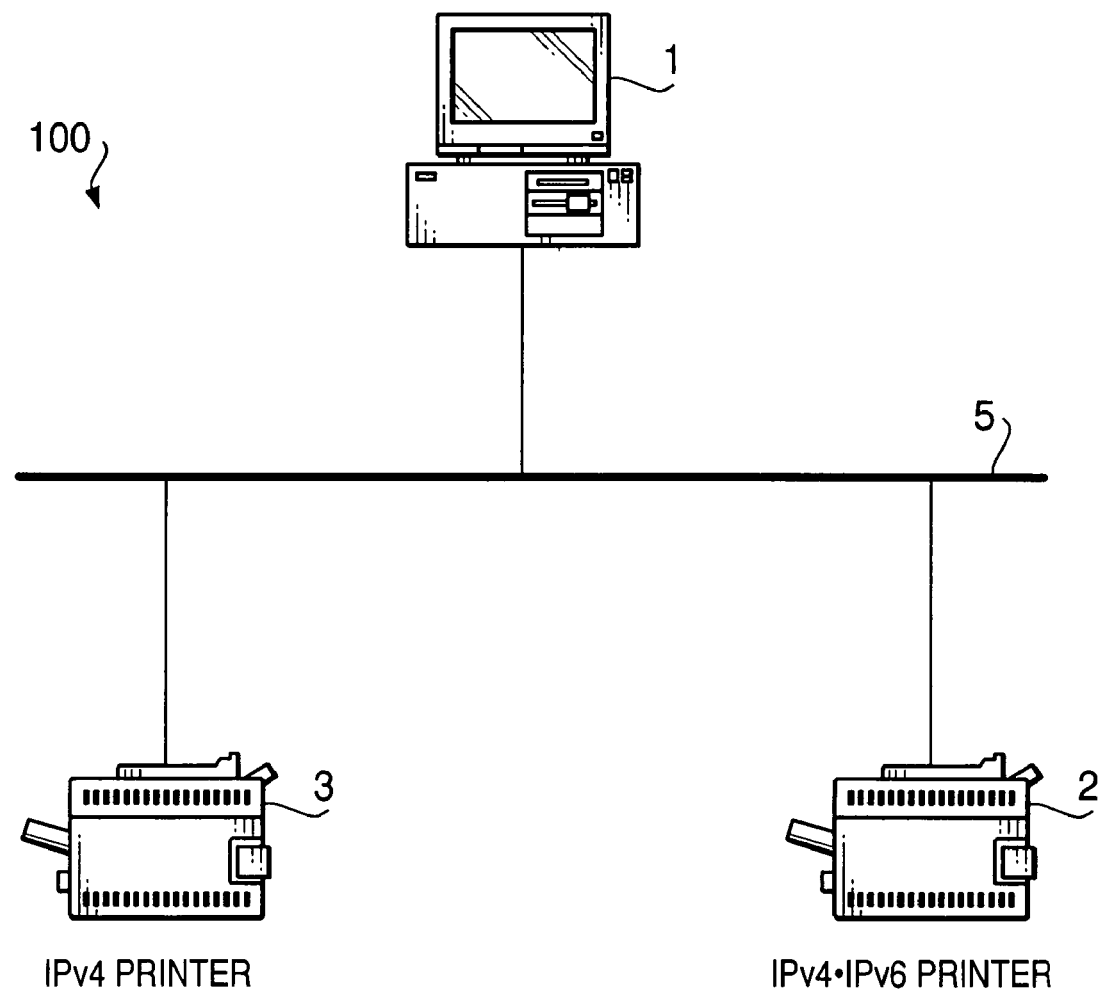
FIG. 1 is a block diagram of a network system in which a management device according to an embodiment of the invention is provided.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a management device used in a network to which nodes are connected. The management device includes an information requesting unit to send out a request packet requesting address information concerning addresses of each node through the network while using a predetermined single protocol, an information receiving unit to receive the address information retuned from each node as a response to the request packet, and an information displaying unit to display addresses in the received address information such that if two or more addresses are in the address information received from a single node, the two or more addresses are treated as addresses belonging to the single node.

With this configuration, the management device recognizes the two or more addresses contained in a response from a single node. Therefore, the information display unit is able to display address information preventing the two or more addresses from being construed as belonging to separate nodes.

In at leas one aspect, the information requesting unit may send out the request packet by broadcast or multicast.

In at least one aspect, the information displaying unit may select at least a part of the two or more addresses assigned to the single node as display target addresses, and displays the display target addresses.

In at least one aspect, the management device may include a representative address selecting unit configured to a representative address from among the display target addresses. In this case, the information displaying unit may display the display target addresses in a plurality of levels, each level having a different amount of information from the other levels.

With this configuration, it is possible to quickly provide adequate address information to a user without displaying excessively detailed information. A rule defining how to select a representative device may be preprogrammed in the management device or the management device may be configured to accept a user operation for inputting the rule. For example, the management device may select an address having the largest value, an address having the smallest value, an address used for a particular protocol, an address without a time limit, an address having a long time limit, a wide area address (a global address) used for communication with a node outside the local network, and a static address.

In at least one aspect, the information displaying device may display the representative address, and thereafter displays the display target addresses other than the representative address.

In at least one aspect, the representative address selecting unit may not select a link local address as the representative address from among the display target addresses.

Since an address not corresponding to a link local address is displayed preferentially, addresses can be notified to a user in a convenient form for a user.

In at least one aspect, the representative address selecting unit may select an address used for a predetermined priority protocol from among the two or more addresses as the representative address if all of the two or more addresses are link local addresses or if all of the two or more addresses are not link local addresses.

Since an address can be selected according t whether to correspond to an address used for a priority protocol, addresses can be notified to a user in a convenient form for a user.

In at least one aspect, the representative address selecting unit may select an address that is used for a predetermined priority protocol from among the two or more addresses as the representative address.

Since an address can be selected according t whether to correspond to an address used for a priority protocol, addresses can be notified to a user in a convenient form for a user.

In at least one aspect, the information displaying unit displays the two or more addresses such that a user is able to recognize that the two or more addresses belong to the single node.

According to another aspect of the invention, there is provided a computer readable medium comprising computer readable instructions that cause a computer, functioning as a management device in a network to which nodes are communicatably connected, to function as: an information requesting unit to send out a request packet requesting for address information concerning addresses of each node through the network while using a predetermined single protocol; an information receiving unit to receive the address information retuned from each node as a response to the request packet; and an information displaying unit to display addresses contained in the received address information in such a manner that if two or more addresses are contained in the address information received from a single node, the two or more addresses are prevented from being construed as belonging to separate nodes.

With this configuration, the management device recognizes the two or more addresses contained in a response from a single node. Therefore, the information display unit is able to display address information preventing the two or more addresses from being construed as belonging to separate nodes.

In at least one aspect, the information requesting unit may send out the request packet by broadcast or multicast.

In at least one aspect, the information displaying unit may select at least a part of the two or more addresses assigned to the single node as display target addresses, and displays the display target addresses.

In at least one aspect, the information displaying unit displays the two or more addresses such that a user is able to recognize that the two or more addresses belong to the single node.

Illustrative Embodiments

Hereafter, an illustrative embodiment according to the invention will be described with reference to the accompanying drawings.

FIG. 1 is a block diagram of a network system 100 in which a management device 1 according to an embodiment of the invention is provided. The network system 100 includes the management device 1 (for example, a personal computer), a printer 2 supporting both of IPv4 and IPv6 protocols, and a printer 3 supporting IPv4 only. The management device 1 and the printers 2 and 3 are capable of communicating with each other via a LAN (local area network) 5. Although in FIG. 1 only two printers 2 and 3 are illustrated, more than two printers (having the function of the printer 2 or 3) may be provided in the network system 100. The LAN 5 includes a relaying device (not shown), such as a hub, and network cables (not shown) connecting devices on the LAN 5 with each other.

Figure 2:
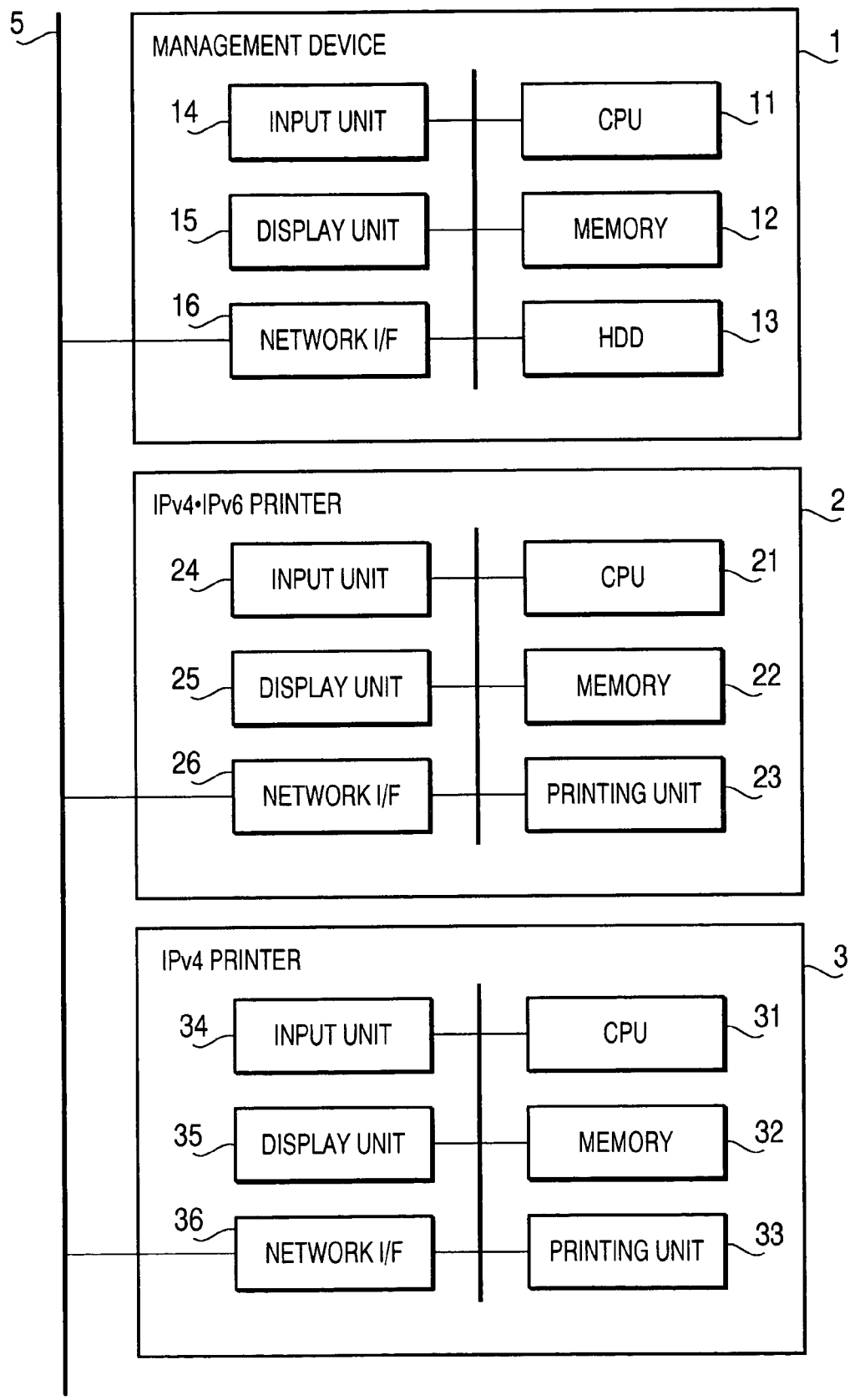
FIG. 2 illustrates a block diagram of each of the management device and the printers provided in the network system.

FIG. 2 illustrates a block diagram of each of the management device 1, and the printers 2 and 3. The management device 1 includes a CPU 11, a memory 12, an HDD (Hard Disk Drive) 13, an input unit 14, a display unit 15 and a network interface 16. The CPU 11 controls the internal components of the management device 1 in accordance with programs stored in the memory 12. The memory 12 may be provided with a ROM in which programs such as a BIOS (Basic Input Output System) is stored, a RAM (to which programs such as an Operating System or application programs are loaded) and a non-volatile RAM (in which setting parameters to be set by a user is stored).

In the HDD 13, programs, such as an Operating System and application programs and various types of data are stored. The input unit 14 is a user interface device to be used by a user to input a command to the management device 1. The input unit 14 may include a keyboard and a pointing device (e.g., a mouse). The display unit 15 is, for example, an LCD, on which various types of information are displayed.

The network interface 16 is configured to interface the management device 1 with other devices on the LAN 5. The network interface 16 is, for example, a NIC (Network Interface Card). The network interface 16 is configured to support both of IPv4 and IPv6 protocols, so that the management device 1 is able to communicate with the printer 2 by selectively using one of the IPv4 and IPv6 protocols.

As shown in FIG. 2, the printer 2 includes a CPU 21, a memory 22, a printing unit 23, an input unit 24, a display unit 25 and a network interface 26. The CPU 21 controls internal components of the printer 2 in accordance with programs stored in the memory 22. The memory 22 includes, for example, a ROM, a RAM and a non-volatile RAM. The non-volatile RAM of the memory 22 contains an MIB (Management Information Base) used for SNMP (Simple Network Management Protocol). In the MIB, device information including a node name, an IP address, a MAC (Media Access Control) address and a serial number of the printer 2 is stored. The printer 2 provides the device information for the management device 1 in response to a data acquisition request transmitted from the management device by SNMP.

The printing unit 23 includes a sheet carrying unit configured to carry a recording medium (e.g., a sheet), and an image forming unit to form an image on a recording medium. The CPU 21 controls the sheet carrying unit and the image forming unit so that an image is formed on a recording medium. The input unit 24 is used by a user to input various types of commands to the printer 2. The input unit 24 is, for example, an operation panel having keys. The display unit 25 is, for example, an LCD, on which various types of information are displayed.

The network interface 26 is configured to interface the printer 2 with other devices on the LAN 5. The network interface 26 includes, for example, a NIC (Network Interface Card). The network interface 26 is configured to support both of IPv4 and IPv6 protocols, so that the printer 2 is able to communicate with the printer 2 by selectively using one of the IPv4 and IPv6 protocols.

Figure 3:
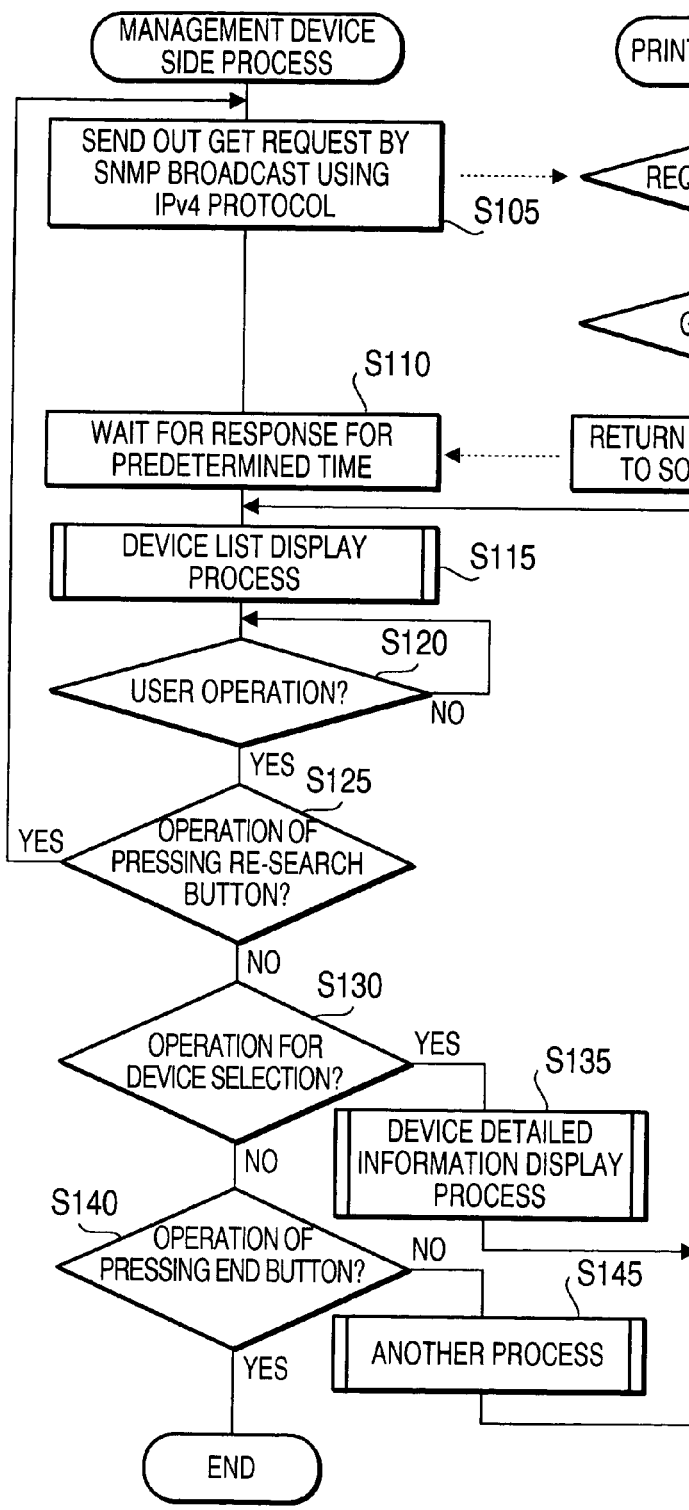
FIG. 3A is a flowchart illustrating a management device side process executed by the management device.
FIG. 3B is a flowchart illustrating a printer side process executed by the printer.

As shown in FIG. 3, the printer 3 includes a CPU 31, a memory 32, a printing unit 33, an input unit 34, a display unit 35 and a network interface 36. The CPU 31 controls internal components of the printer 3 in accordance with programs stored in the memory 32. Similarly to the printer 2, the memory 32 includes, for example, a ROM, a RAM and a non-volatile RAM. The non-volatile RAM of the memory 32 contains an MIB. In the MIB, device information including a node name, an IP address, a MAC (Media Access Control) address and a serial number of the printer 3 is stored. The printer 3 provides the device information for the management device 1 in response to a data acquisition request transmitted from the management device 1 by SNMP.

The printing unit 33 has substantially the same configuration as that of the printing unit 23 of the printer 2. The display unit 35 is, for example, an LCD, on which various types of information are displayed.

The network interface 36 is configured to only support the IPv4 protocol. Therefore, the printer 3 is allowed only to use IPv4 protocol to communicate with the management device 1.

FIGS. 3A and 3B are flowcharts that show a communication process performed between the management device 1 and the printer 2 (or 3). FIG. 3A shows a management device side process, and FIG. 3B shows a printer side process. The management device side process is executed under control of the CPU 11 of the management device 1, and is initiated, for example, when the management device 1 starts up, or when a predetermined user operation is conducted through the input unit 14. The printer side process is executed under control of the CPU 21 (or CPU 31) of the printer 2 (or 3). The printer side process runs on the printer 2 (or 3) during the power ON state of the printer 2 (or 3).

As shown in FIG. 3A, when the management device side process is initiated, the management device 1 sends out a GET request for device information in accordance with an SNMP-based broadcast (step S105). It should be understood that the management device 1 uses the IPv4 protocol in step S105 to enable IPv4 devices to respond to a request from the management server 1, considering that an IPv4 device is not able to respond to an IPv6 based request. In step S105, the management device 1 sends out a request for device information, such as, an IPv4 address, an IPv6 address, a status of a device and a model name.

In step S105, the management device 1 requests for both of the IPv4 and IPv6 addresses using the IPv4 protocol. In the case where a request is sent out by the SNMP based broadcast using the IPv4 protocol, a packet returned in response to the request contains an IPv4 address in addition to data requested by the request. Therefore, in step S105, the management device 1 may request for only a node name, an IPv6 address, a status of a device and a model name, without explicitly requesting for an IPv4 address.

As shown in FIG. 3A, the printer 2 (or 3) judges whether a request from a node on a network is received (step S205). The printer 2 (or 3) waits until a request is received (S205: NO). If the GET request is sent out by the management device 1 in step S105, the printer 2 (or 3) receives the GET request and judges that a request from a node on a network is received (S205: YES).

In step S210, the printer 2 (or 3) judges whether the received request is a GET request (step S210). If the received request is a GET request (S210: YES), the printer 2 (or 3) returns device information containing requested items (e.g., a node name, an IPv4 address, an IPv6 address, a status of a device, a model name) to a source of the request for the device information. As described above, the requested item may not include an IPv4 address. After step S215 is finished, control returns to step S205 to wait until a request from a node on a network is received.

If the received request is not the GET request (S210: NO), the printer 2 (or 3) executes another process corresponding to the received request (step S220). Then, control returns to step S205. For example, a process, in which a printing operation is executed for print data received from a node on a network, is executed in step S220.

After step S105 is processed, the management device 1 moves to a waiting state of waiting for a response for a predetermined time (step S10). If step S215 is processed on the printer 2 (or 3) in the waiting state of the management device 1, the management device 1 receives the device information returned from the printer 2 (or 3) as a response to the request. After receiving the device information, the management device 1 executes a device list display process (step S115).

Figure 4:
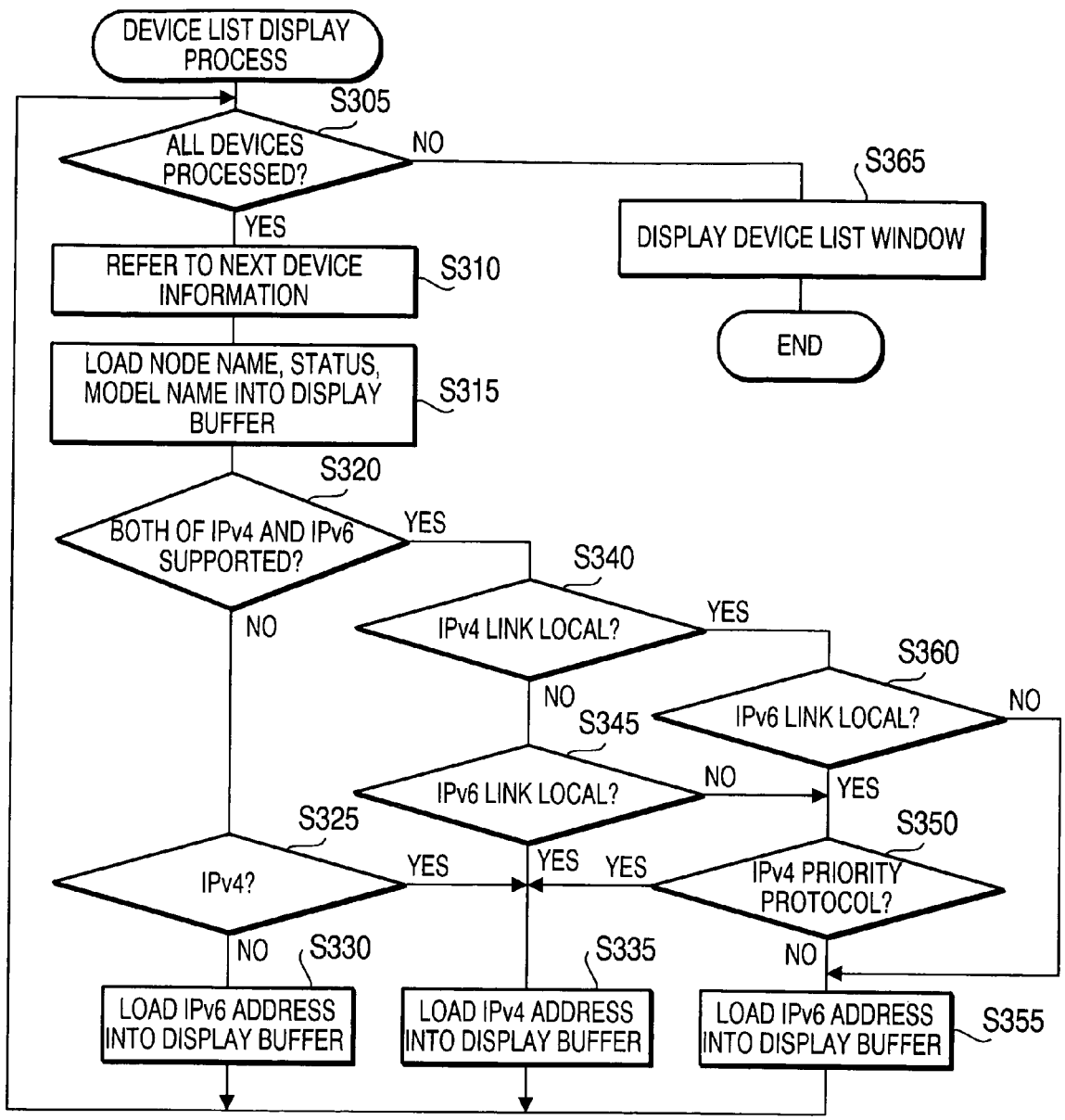
FIG. 4 is a flowchart illustrating a device list display process executed by the management device.

FIG. 4 is a flowchart illustrating the device list display process executed under control of the CPU 11 of the management device 1. As show in FIG. 4, first, the management device 1 judges whether all of the devices for which the device information is received have been processed (step S305). If an unprocessed device exists (S305: NO), the management device 1 refers to device information of a device to be targeted next (step S310). Then, the management device 1 loads a node name, a status and a model name contained in the device information into a display buffer (step S315).

Next, the management device 1 loads a representative address into the display buffer through steps S320 to S355. More specifically, in step S320, the management device 1 judges whether the device information contains both of the IPv4 address and the IPv6 address. If the device information contains one of the IPv4 address and the IPv6 address (S320: NO), the management device 1 judges whether the address contained in the device information is an IPv4 address (step S325). If the address is not the IPv4 address (S325: NO), the management device loads the IPv6 address into the display buffer (step S330). Then, control returns to step S305.

If it is judged in step S320 that the device information contains both of the IPv4 address and the IPv6 address (S320: YES), the management device 1 judges whether the IPv4 address contained in the device information is a link local address (step S340). If the IPv4 address is not a link local address (S340: NO), the management device 1 judges whether the IPv6 address is a link local address (step S345).

If the IPv6 address is a link local address (S345: YES), the management device 1 loads the IPv4 address into the display buffer (step S335). Then, control returns to step S305. If the IPv6 address is not a link local address (S345: NO), the management device 1 judges whether a priority protocol is IPv4 (step S350). If a priority protocol is IPv4 (S350: YES), control proceeds to step S335 where the management device 1 loads the IPv4 address into the display buffer. Then, control returns to step S305. If a priority protocol is not IPv4 (S350: NO), control proceeds to step S355 where the management device 1 loads an IPv6 address into the display buffer. Then, control returns to step S305.

The "priority protocol" defines a protocol to which higher priority is assigned, for example, in a network having mixed protocols of the IPv4 and IPv6. For example, a user is allowed to define IPv4 as a priority protocol if the user principally uses IPv4 in the network having mixed protocols of IPv4 and IPv6, while the user is allowed to define the IPv6 as a priority protocol if the user principally uses IPv6 in the network having the mixed protocols of IPv4 and IPv6.

If it is judged in step S340 that the IPv4 address is a link local address (S340: YES), control proceeds to step S360 where the management device 1 judges whether the IPv6 address is a link local address. If the IPv6 address is not a link local address (S360: NO), the management device 1 loads the IPv6 address into the display buffer (S355). Then, control returns to step S305. If the IPv6 address is a link local address (S360: YES), control proceeds to step S350 where the management device 1 judges whether a priority protocol is IPv4. If a priority protocol is IPv4 (S350: YES), the management device 1 loads the IPv4 address into the display buffer (S335). Then, control returns to step S305.

If a priority protocol is not IPv4 (S350: NO), the management device 1 loads the IPv6 address into the display buffer (S355). Then, control returns to step S305.

By processing steps S320 to S355, one of the IPv4 address and the IPv6 address is loaded into the display buffer for each of the devices as the representative address. Steps S305 to S355 are processed repeatedly until all of the devices for which the device information is obtained have been processed. After all of the devices have been processed (S305: YES), the management device 1 displays a device list window on the display unit 15 (step S365).

Figure 5:
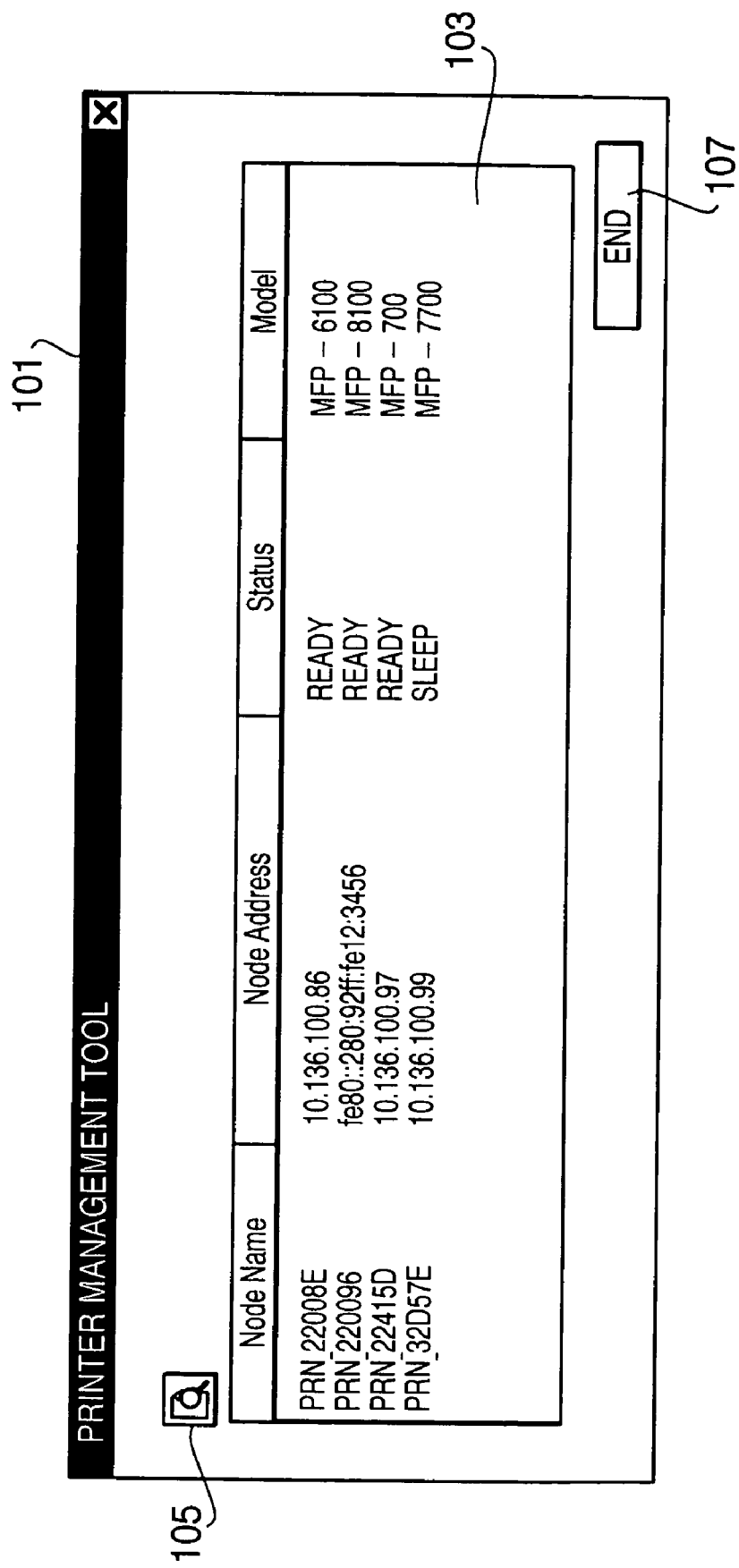
FIG. 5 illustrates an example of a device list window displayed on a display of the management device.

More specifically, in step S365, a device list window 101 shown in FIG. 5 is displayed on the display unit 15 of the management device 1. In the device list window 101 shown in FIG. 5, a device information display field 103, a re-search button 105 and an end button 107 are provided. The node name, the status, and the model name loaded into the display buffer in step S315 and the IPv4 address or the IPv6 address loaded into the display buffer in step S330, S335 or S355 are displayed in the device information display field 103.

After the device list window 101 is displayed on the display unit 15, the device list display process terminates.

Referring back to FIG. 3, after finishing the device list display process in step S115, the management device 1 judges whether a user operation is conducted through the input unit 14 (step S120). The management device 1 waits until a user operation is conducted (S120: NO). If a user operation is conducted through the input unit 14 (S120: YES), the management device I judges whether the user operation is an operation of pressing the re-search button 105 (step S125). If the user has pressed the re-search button 105 (S125: YES), control returns to step S105 so as to restart the management device side process.

If the user has not pressed the re-search button 105 (S125: NO), the management device 1 judges whether the user operation is an operation of selecting a device (step S130). The operation of selecting a device is conducted, for example, by clicking on one of devices displayed on the device information display field 103 or by conducting the equivalent operation through a keyboard.

Figure 6:
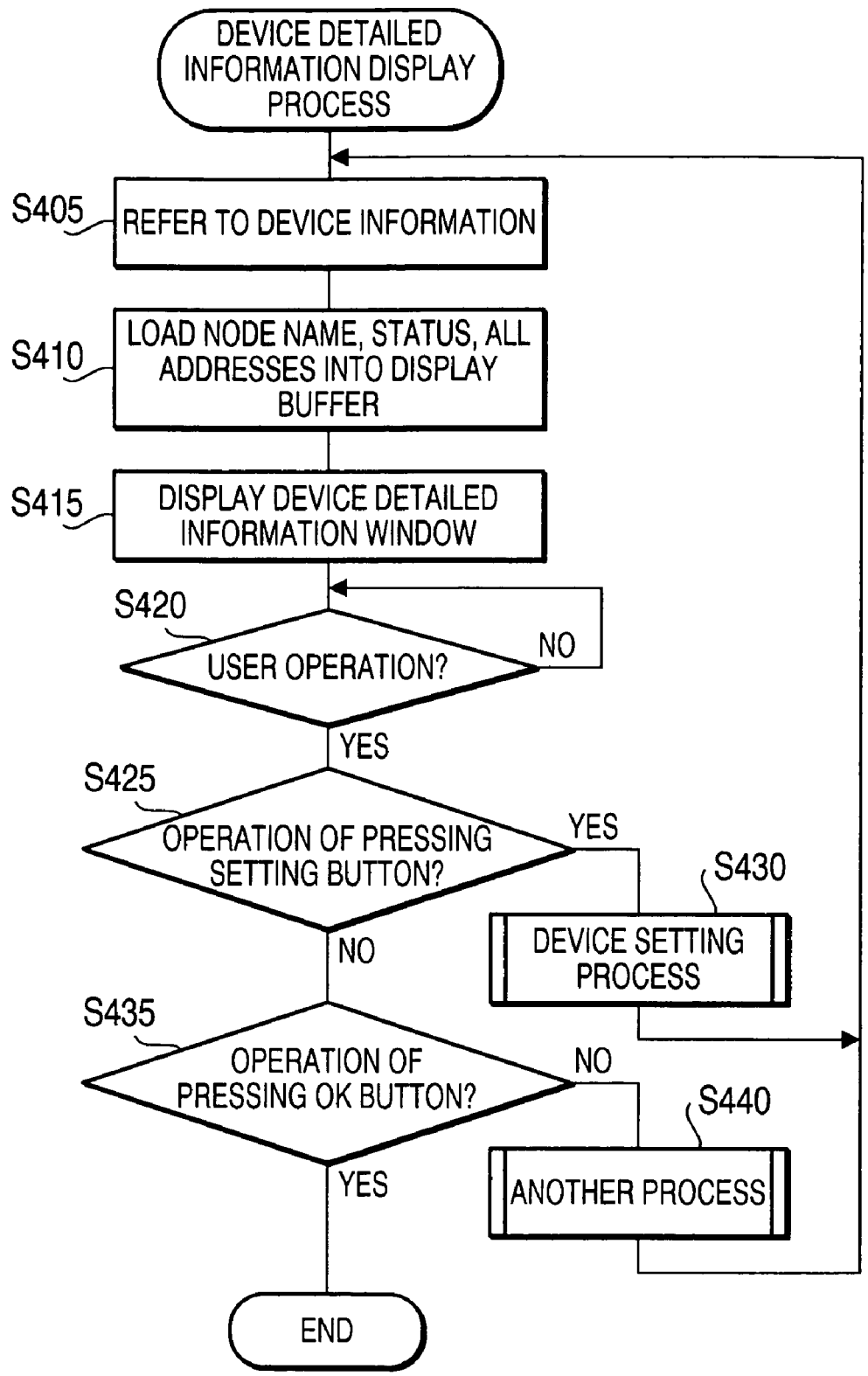
FIG. 6 is a flowchart illustrating a device detailed information display process executed by the management device.

If the user has conducted the operation of selecting a device (S130: YES), the management device 1 executes a device detailed information display process (step S135). FIG. 6 is a flowchart illustrating the device detailed information display process executed under control of the CPU 11 of the management device 1. As shown in FIG. 6, first, the management device 1 refers to the device information of the device selected by the user (step S405), loads the node name, the status, and all of the addresses contained in the device information, into the display buffer (step S410), and then displays a device detailed information window (step S415).

Figure 7:
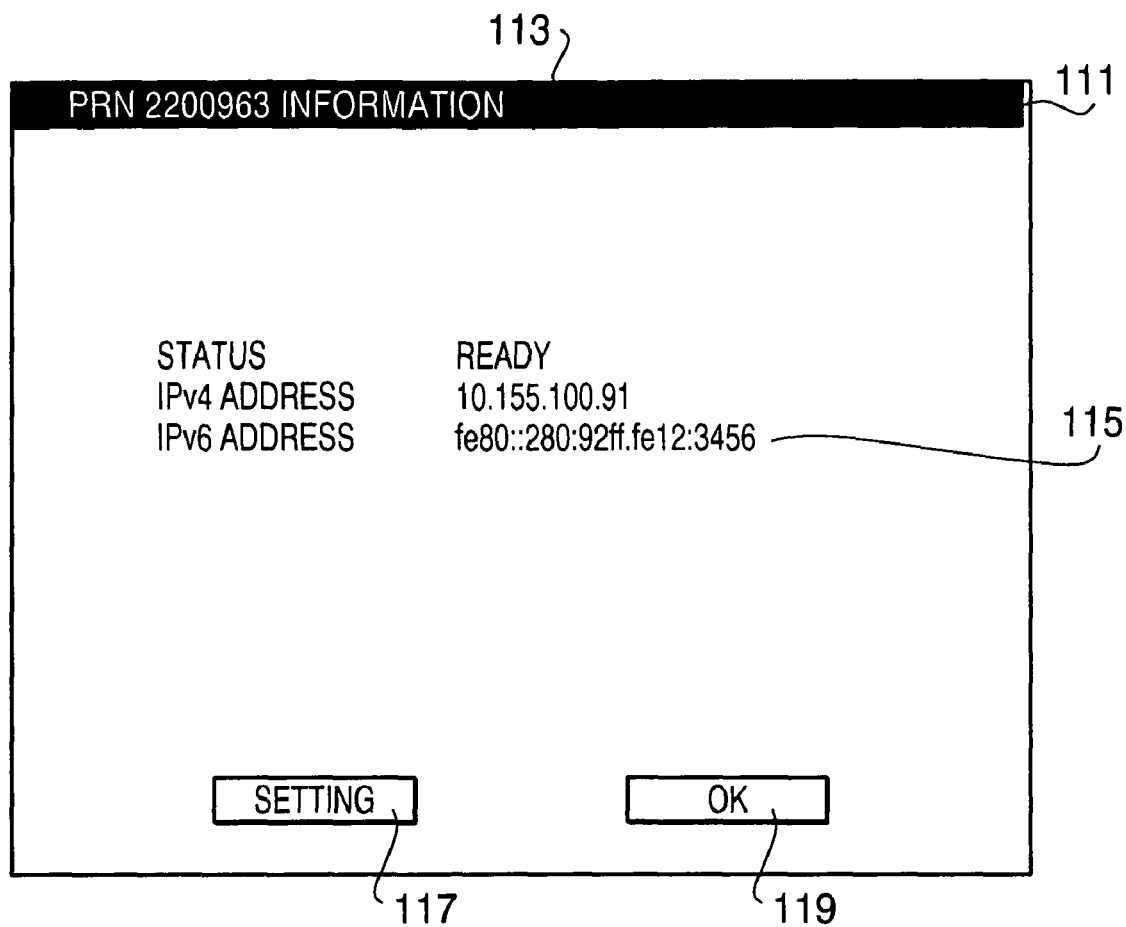
FIG. 7 illustrates an example of a device detailed information window displayed on the display of the management device.

FIG. 7 is an example of a device detailed information window 111 displayed on the display unit 15 in step S415. The device detailed information window 111 is provided with a title bar 113 in which a node name is also displayed, an information display area 115 in which a status, an IPv4 address and an IPv6 address are displayed, a setting button 117 and an OK button 119. In the device detailed information window 1111, the node name, the status, the IPv4 address and the IPv6 address loaded into the display buffer in step S410 are displayed.

As described above, at the stage where the device list window 101 is displayed, a list of searched devices are displayed together with the representative addresses of the searched devices. On the other hand, at the stage where the device detailed information window 111 is displayed, all of the addresses assigned to the selected device are displayed.

After the device detailed information window 111 is displayed, the management device 1 judges whether a user operation is conducted through the input unit 14 (step S420). The management device 1 waits until a user operation is conducted (S420: NO). If a user operation is conducted (S420: YES), the management device 1 judges whether the user operation is an operation of pressing the setting button 117 (step S425). If the setting button has been pressed (S425: YES), a device setting process is executed (step S430).

For example, a process in which the setting of a device is modified from the management device 1, or a process in which the modified setting is transmitted to the device is executed in step S430. After executing the device setting process, control returns to step S405.

If the user has not pressed the setting button 117 (S425: NO), control proceeds to step S435 where the management device 1 judges whether the user operation is an operation of pressing the OK button 119 (step S435). If the OK button 119 has not been pressed (S435: NO), another process corresponding to the user operation is executed (step S440). Then, control returns to step S405.

If the OK button 119 has been pressed (S435: YES), the device detailed information display process terminates. After the device detailed information display process is finished, control returns to step S115 of FIG. 3.

Referring back to FIG. 3, if it is judged in step S130 that the user has not conducted the operation of selecting a device (S130: NO), control proceeds to step S140 where the management device 1 judges whether the user operation is an operation of pressing the end button 107. If the end button 107 has not been pressed (S140: NO), the management device 1 executes another process corresponding to the user operation (step S145). Then, control returns to step S115. If the end button 107 has been pressed (S140: YES), the management device side process terminates.

As described above, the management device 1 uses the IPv4 protocol for broadcasting the request for information. The management deice 1 is able to receive address information containing addresses used in both of the IPv4 and IPv6, as a response to the request sent out by the management device 1. After receiving the address information, the management device 1 displays addresses contained in the address information in such a manner that the user is able to recognize that displayed addresses are assigned to a single device.

Therefore, according to the embodiment, the management device 1 recognizes the IPv4 and IPv6 addresses belonging to a single node based on the response made by the single node. Consequently, the management device 1 is prevented from erroneously recognizing that the IPv4 address and the IPv6 address are assigned to two separate nodes regardless of the fact that the IPv4 and IPv6 addresses are assigned to a single node.

According to the embodiment, the management device 1 increases the degree of fineness of information on a device by displaying the device list window 101 and the device detailed information window 111 in this order. In the device list window 101, one of the IPv4 and IPv6 addresses is displayed as a representative addresses, and thereafter addresses other than the representative address are displayed in the device detailed information window 101. Such a configuration prevents excessively detailed information from being notified to a user who does not necessarily want detailed information on a node. In other words, according to the embodiment, adequate information can be quickly provided for a user.

If a link local address is contained in the obtained addresses, the management device 1 selects an address not corresponding to a link local address, as a representative address to be displayed. Such a configuration makes it possible to preferentially display an address not corresponding to a link local address having a high possibility of being managed by a user purposefully, on the device list window 101. In other words, addresses can be notified to a user in a convenient form for a user.

If an address can not be selected in regard to whether to correspond to a link local address, the management device 1 selects an address in regard to whether to correspond to a priority protocol. Such a configuration makes it possible to preferentially display an address used in a priority protocol. In other words, addresses can be notified to a user in a convenient form for a user.

Although the present invention has been described in considerable detail with reference to certain preferred embodiments thereof, other embodiments are possible.

In the above mentioned embodiment, information on a device is displayed in stages by displaying the device list window 101 and the device detailed information window 111 in this order. However, if two or more display target addresses are assigned to a single node, the device information on the node may be displayed in a single window as long as the user is able to recognize that the display target addresses are assigned to the single node.

Figure 8:
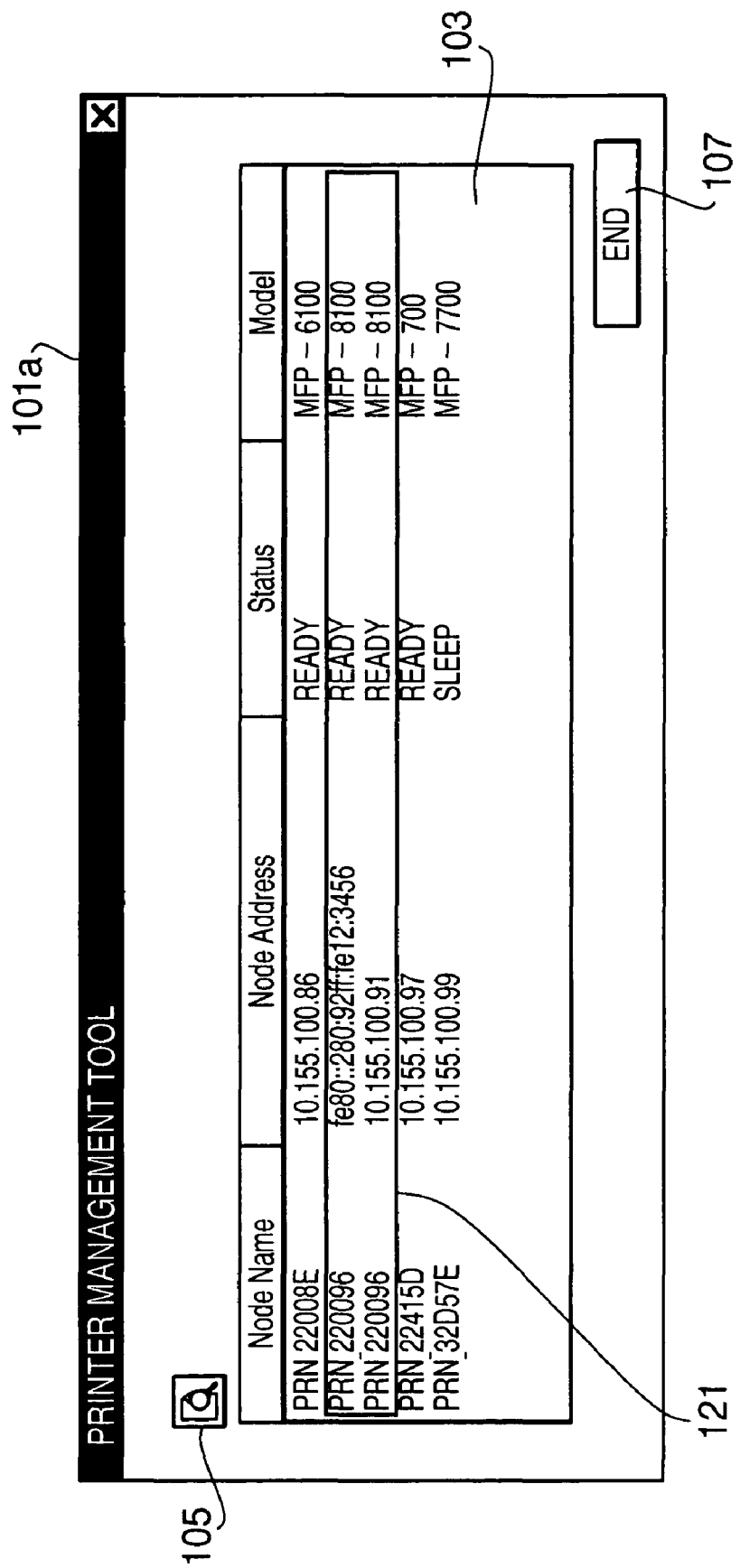
FIG. 8 illustrates an example of a device list window in which display target addresses assigned to a single node are displayed in such a manner that a user is able recognize the display target addresses are assigned to the single node.

FIG. 8 is an example of such a single window (a device list window 101a) in which the display target addresses assigned to a single node are displayed in such a manner that a user is able recognize the display target addresses are assigned to the single node. In FIG. 8, addresses are arranged in a vertical direction in the device information display field 103. In FIG. 8, two or more display target addresses assigned to a single node are surrounded by a frame 121 so that a user is able to recognize that the display target addresses in the frame 121 are assigned to a single node.

Figure 9:
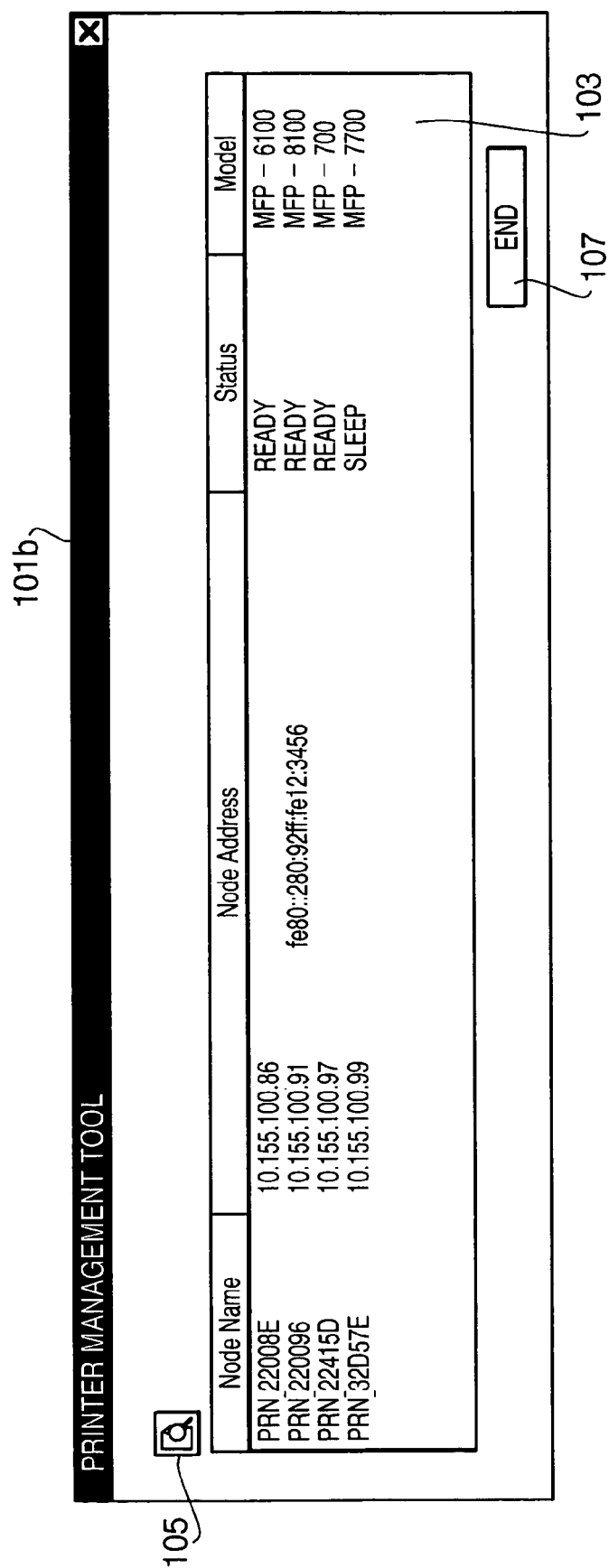
FIG. 9 illustrates another example of a device list window in which display target addresses assigned to a single node are displayed in such a manner that a user is able recognize the display target addresses are assigned to the single node.

FIG. 9 is another example of a single window (a device list window 101b) in which the display target addresses assigned to a single node are displayed in such a manner that a user is able to recognize that the display target addresses are assigned to the single node. In FIG. 9, the display target addresses assigned to a single node are arranged in a lateral direction so that a user is able to recognize that the display target addresses arranged in a lateral direction are assigned to a single node.

Figure 10:
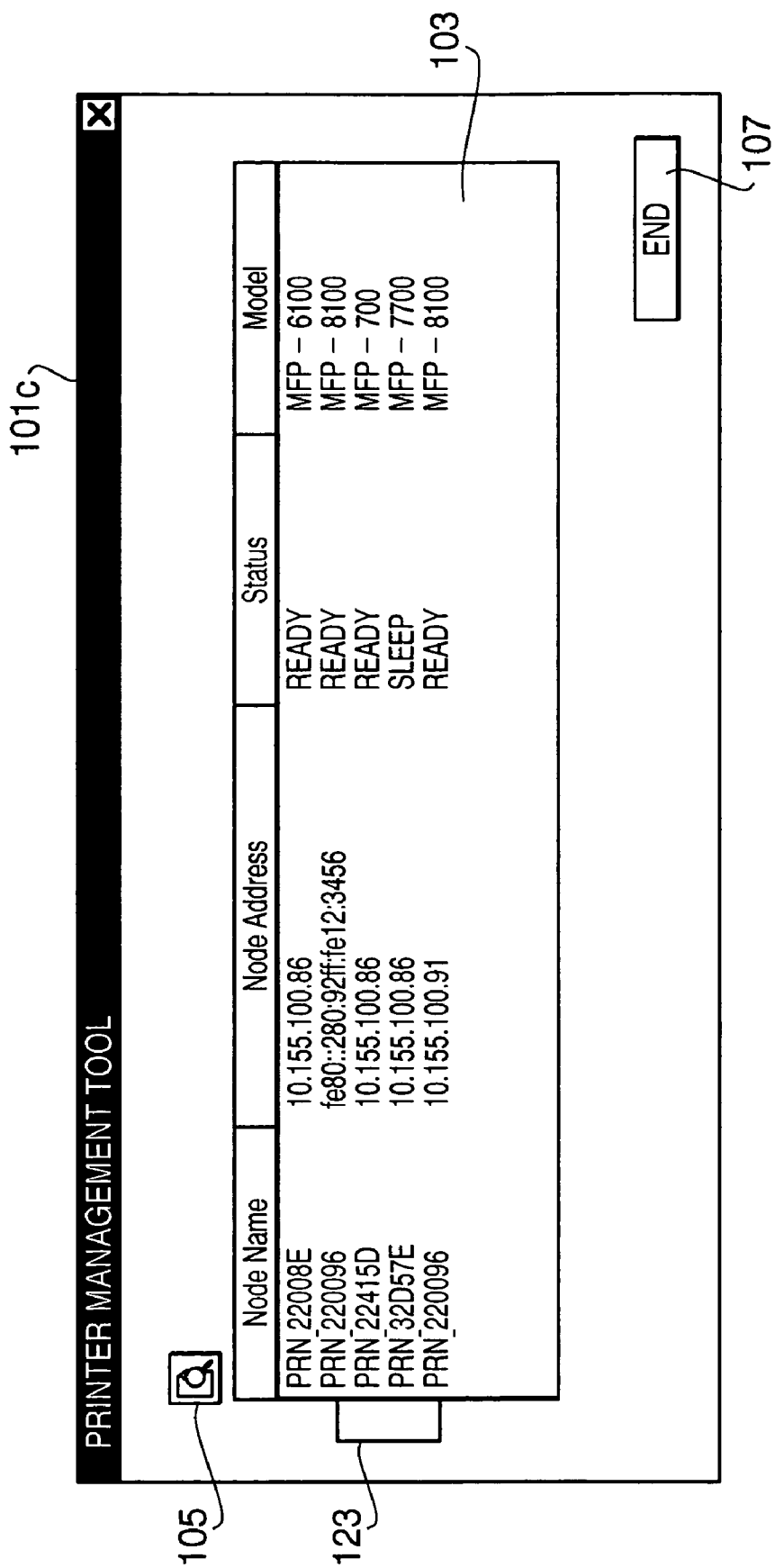
FIG. 10 illustrates another example of a device list window in which display target addresses assigned to a single node are displayed in such a manner that a user is able recognize the display target addresses are assigned to the single node.

FIG. 10 is another example of a single window (a device list window 101c) in which the display target addresses assigned to a single node are displayed in such a manner that a user is able recognize that the display target addresses are assigned to the single node. In the device information display field 103 of the device list window 101c, display target addresses assigned to a single node are arranged in a vertical direction. On the left side of the device information display field 103, a link line 123 is displayed so as to connect tow pieces of information having the displayed target addresses assigned to a single node.

In the above mentioned embodiment, the network system 100 having mixed protocols of the IPv4 and IPv6 has been described by way of example. In the network system 100, the management device 1 operates to obtain both of the IPv4 and IPv6 addresses from each of the printer 2 and 3 using the IPv4 protocol. However, another protocol may be used to transmit a request packet requesting for device information to nodes on a network.

For example, in the network having the mixed protocols of IPv4 and IPv6, the management device may use the IPv6 protocol so as to obtain both of the IPv4 and IPv6 addresses from each of devices on a network. It is understood that a single protocol for sending out the request packet for device information may be selected from various types of protocols, considering that a protocol to be selected needs to be supported by as many devices in a network as possible.

In the above mentioned embodiment, the SNMP-based broadcast is performed in accordance with the IPv4 protocol. However, another protocol may be used to collect device information from nodes on a network. For example, a multicast may be used to collect device information from nodes on a network.

What is claimed is:

1. A management device used in a network to which nodes are connected, comprising:
   an information requesting unit to send out a request packet requesting IP address information concerning IP addresses of each node through the network while using one of an IPv4 protocol or an IPv6 protocol;
   an information receiving unit to receive the IP address information returned from each node as a single response to the request packet, wherein if two or more IP addresses, including at least an IPv4 address and an IPv6 address, respectively used for the IPv4 protocol and the IPv6 protocol are assigned to a single node, the IP address information received from the single node contains the two or more IP addresses; and
   an information displaying unit to display, on a display, IP addresses in the received address information such that if the two or more IP addresses are in the IP address information received from the single node, the two or more IP addresses are treated as IP addresses belonging to the single node.

2. The management device according to claim 1, wherein the information requesting unit sends out the request packet by broadcast or multicast.

3. The management device according to claim 1, wherein the information displaying unit selects at least a part of the two or more addresses assigned to the single node as display target addresses, and displays the display target addresses.

4. The management device according to claim 3, wherein the information displaying unit displays the display target addresses in a plurality of levels, each level having a different amount of information from the other levels.

5. The management device according to claim 4, wherein the information displaying device displays the representative address, and thereafter displays the display target addresses other than the representative address.

6. The management device according to claim 4, wherein the representative address selecting unit does not select a link local address as the representative address from among the display target addresses.

7. The management device according to claim 6, wherein the representative address selecting unit selects an address used for a predetermined priority protocol from among the two or more addresses as the representative address if all of the two or more addresses are link local addresses.

8. The management device according to claim 6, wherein the representative address selecting unit selects an address used for a predetermined priority protocol from among the two or more addresses as the representative address if all of the two or more addresses are not link local addresses.

9. The management device according to claim 4, wherein the representative address selecting unit selects an address that is used for a predetermined priority protocol from among the two or more addresses as the representative address.

10. The management device according to claim 1, wherein the information displaying unit displays the two or more addresses such that a user is able to recognize that the two or more addresses belong to the single node.

11. The management device according to claim 1, wherein the information displaying unit comprises a representative IP address selecting unit configured to select a representative IP address from among the two or more IP addresses, the information displaying unit initially displays the representative IP address selected by the representative IP address selecting unit on the display, and thereafter displays an IP address other than the representative IP address on the display.

12. A non-transitory computer readable storage medium encoded with computer readable instructions that cause a computer, functioning as a management device in a network to which nodes are communicatably connected, to function as:

an information requesting unit to send out a request packet requesting IP address information concerning IP addresses of each node through the network using one of an IPv4 protocol or an IPv6 protocol;

an information receiving unit to receive the IP address information returned from each device as a single response to the request packet, wherein if two or more IP addresses, including at least an IPv4 address and an IPv6 address, respectively used for the IPv4 protocol and the IPv6 protocol are assigned to a single node, the IP address information received from the single node contains the two or more IP addresses; and an information displaying unit to display, on a display, IP addresses in the received address information such that if the two or more IP addresses are in the IP address information received from the single node, the two or more IP addresses are treated as IP addresses belonging to the single node.

13. The non-transitory computer readable storage medium according to claim 12, wherein the information requesting unit sends out the request packet by broadcast or multicast.

14. The non-transitory computer readable storage medium according to claim 12, wherein the information displaying unit selects at lest a part of the two or more addresses assigned to the single node as display target addresses, and displays the display target addresses.

15. The non-transitory computer readable storage medium according to claim 12, wherein the information displaying unit displays the two or more addressees such that a user is able to recognize that the two or more addresses belong to the single node.

16. The non-transitory computer readable storage medium according to claim 12, wherein the information displaying unit comprises a representative IP address selecting unit configured to select a representative IP address from among the two or more IP addresses, the information displaying unit initially displays the representative IP address selected by the representative IP address selecting unit on the display, and thereafter displays an IP address other than the representative IP address on the display.

* * * * *